RESIN BONDED ELECTRICAL RESISTOR COMPOSITION

Filed Sept. 20, 1965 2 Sheets-Sheet 1

INVENTORS
IRVIN J. MCKEAND
JAMES F. SPRING
BY Robert J. Crawford
ATTORNEY

RESIN BONDED ELECTRICAL RESISTOR COMPOSITION

Filed Sept. 20, 1965 2 Sheets-Sheet 2

% RESISTANCE CHANGE

INVENTORS
IRVIN J. MCKEAND
JAMES F. SPRING
BY Robert J. Crawford
ATTORNEY

United States Patent Office 3,328,317

Patented June 27, 1967

3,328,317

RESIN BONDED ELECTRICAL RESISTOR COMPOSITION

Irvin J. McKeand, Fayetteville, and James F. Spring, Medrow, N.Y., assignors to Air Reduction Company, Incorporated, New York, N.Y., a corporation of New York Filed Sept. 20, 1965, Ser. No. 488,664
2 Claims. (Cl. 252—511)

Figure 1:
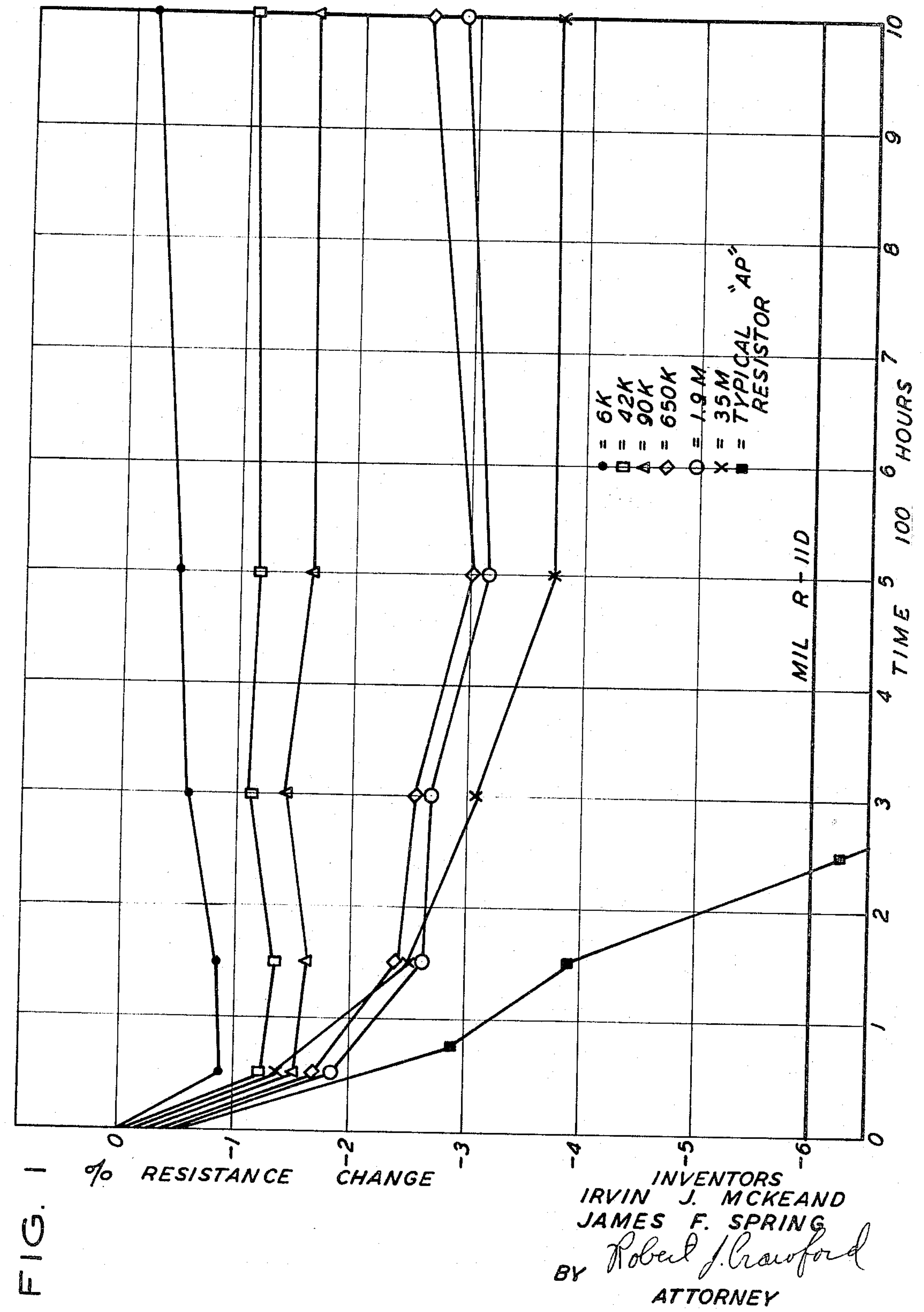

This application is a continuation-in-part of United States patent application Ser. No. 302,785 filed Aug. 19, 1963, now abandoned.

The present invention relates to electrical resistors and to a method for producing these resistors. More particularly, the present invention is concerned with new and improved electrical resistors of the type which may be used in printed circuits.

Resistor elements which comprise a dispersion of finely divided conductive particles in a solid dielectric such as, for example, a polymerized resin, are well known in the prior art. Generally, these resistors comprise a dispersion of finely divided carbon or metal particles in a solid resinous material which may additionally contain various organic or inorganic inert nonconductive filler materials. The resins that are used in the production of such resistors may be of either a thermosetting or a thermoplastic nature, depending of course upon the specific requirements of a particular installation. Natural resins such as shellac, as well as a variety of synthetic resinous materials such as phenolic condensation products, alkyd resins, vinyl resins, etc., have been found suitable in the manufacture of such resistors as described above.

Aside from their use in the production of molded or cast resistors, these conductor filled resinous materials may be applied in thin layers onto a nonconducting base, i.e. a ceramic, glass, paper, fiber, or resin base. Such resistors are generally referred to as film resistors and are the subject of this invention. A variety of methods are currently employed in order to apply these thin coatings such as for example stenciling, printing, painting, or spraying directly upon the nonconducting base. In modern radio circuits, variable resistances of the latter type are used as tone and volume controls and are included in incident portions of the circuits. In addition, fixed resistances of this type are used in filter networks, audio frequency coupling stages, and in general wherever resistances occupying a minimum of space are desired.

Normally, the resistance of any particular resistor material comprising conductive particles dispersed throughout a solid resinous dielectric and/or filler material can only be controlled or regulated by altering the proportion of the weight of dielectric and/or filler used to the weight of conducting particles employed. Thus, a resistor having a low ratio of weight of resin, or resin plus filler, to the weight of conductive particles, has a low resistance. Correspondingly, resistors having high values of resistance are obtained by increasing the proportion of dielectric material employed. Unfortunately, however, an increase in the dielectric-to-conductive particle weight ratio generally results in the impairment of certain electrical properties of the resistor element. Notably, the value of the voltage coefficient as well as the noise factor of a resistor is seen in increase with an increase in the dielectric-to-conductor ratio. Accordingly, it is often extremely difficult, if not impossible, to obtain satisfactory conductor-filled resin resistors having high values of resistance without using different, and often more expensive materials than those employed in the manufacture of resistors of this nature having low resistance values.

A further problem inherent in the use of the conductor-filled resinous resistors of the prior art is their inability to maintain constant values of resistance after prolonged use at elevated temperatures. Thus, this type of resistor often proves to be entirely inadequate in various electronic circuit applications where the resistance value of resistance used has to be maintained at a fairly constant level.

In United Staes Patent No. 3,056,750 issued Oct. 2, 1962, and assigned to the assignee of the present invention, an effort was made to overcome the foregoing disadvantages. Such patent discloses a resistor which comprises discrete conductive units dispersed in one or more solid resinous dielectric materials. Each one of these discrete units in turn comprises an aggregate of conductive particles which have been precoated, at least in part, with one or more dielectric materials which subsequently may be polymerized, or partially polymerized, so as to bind the individual conductive particles together to form the aggregate, or unit. By virtue of the polymerized, or partially polymerized resinous coating, the conductive particles are held in such a relation as to establish an electrical pathway of a certain definite resistivity through the aggregate. By means of subsequent manufacturing techniques, the discrete units, as previously noted, are suspended and held in a polymerized resin dielectric, which resin may be the same or different resin or resins from those used to precoat the conductive particles and which may contain one or more filler materials which also are dielectric and are thus maintained in such a relation as to provide an electrical pathway of a certain definite resistivity through the completed resistor.

Resistors made by the assignee of the present invention in accordance with the teachings of United States Patent No. 3,056,750 have proved satisfactory for certain uses in the entertainment field, i.e. the television and radio industry, but are not satisfactory for military or other commercial usage due to the inability of the resistors to meet the load-life characteristics set forth in the Military Specification MIL R–11D which requires that there be a prescribed minimum percentage change in resistance after the resistors are tested under load for 1000 hr. or more. It was found that the resistors made in accordance with the teachings of United States Patent No. 3,056,750, which I shall refer to as the AP resistor, failed in load-life tests of MIL R-11D at approximately 250 hr. It is therefore apparent that additional improvements must be made in the resistor composition if the requirements of MIL R–11D are to be satisfactorily met.

The AP resistor referred to above comprises a nonconductive substrate having a conductive composition deposited thereon, said composition containing an inert filler and a plurality of discrete units dispersed in a polymerized phenolic resin, each discrete unit comprising an aggregate of conductive particles of carbon, which particles are, in turn, bonded together by a solid polymerized phenolic resin to form the discrete unit by a process fully described in the previously mentioned United States Patent No. 3,056,750.

In one prior art attempt to improve the load-life of the AP resistor, a 100% silicone resin was substituted for the phenolic resin binder in which the discrete units of the AP resistor were dispersed. However, a resistor manufactured with such silicone resin binder was entirely unsatisfactory since the silicone was attacked by degreasing chemicals such as trichloroethylene and/or its vapors which are used during manufacture. It was therefore found that a 100% silicone resin binder was unsuitable for use in printed composition resistors.

We have discovered that by combining phenolic resins and silicone resins to form the dielectric binders for the discrete conductive units in a manner as disclosed hereinafter, it is possible to manufacture composition resistors for use in printed applications which meet or exceed all the requirements of the MIL R–11D.

It is therefore an object of this invention to provide an improved carbon composition resistor, and more particularly to provide a carbon composition resistor ink that can be applied by dipping, spraying, brushing, and printing, as in printed electronic circuits and tubular resistors or substrates.

It is another object of the invention to provide a composition resistor ink that produces an improved resistor of the character indicated with greater stability and longer load life at substantially constant electrical properties.

An additional object is to provide an improved composition, and more particularly a carbon composition resistor ink that exhibits good electrical properties, such as voltage coefficient and temperature coefficient; and that has outstanding stability in the standard ¼ watt life test.

It is yet another object of the invention to provide resistors that are stable in the processing normally encountered in their manufacture and use, such as soldering, degreasing by use of elements such as trichloroethylene and/or its vapors, application of protective coatings and the baking of said coatings when baking is required.

Other objects, features, and advantages of the invention will appear or be pointed out as the description proceeds.

Figure 2:
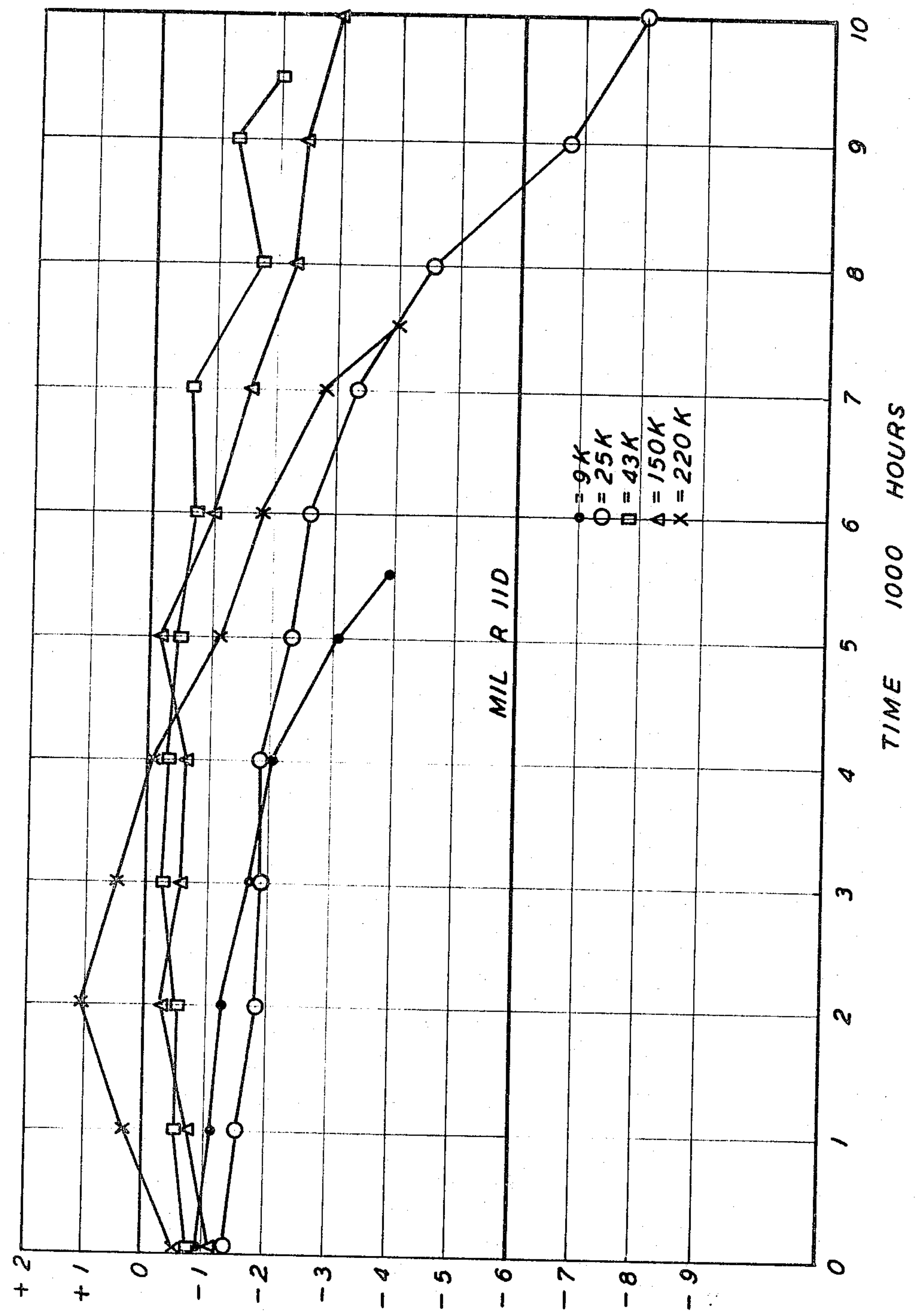

In the drawings forming a part hereof:

FIGURE 1 compares the load life characteristics of resistors made with a first novel composition of this invention with a prior art resistor; and FIGURE 2 compares the load life characteristics of a second novel composition of this invention with a prior art resistor.

In improving the load life of the AP resistors made in accordance with the teachings of United States Patent No. 3,056,750, it became necessary to modify the phenolic resin binder in which the discrete conductive units of the AP resistor were dispersed. We have discovered that if a binder consisting of a mixture of phenolic resin and silicone resin are used in proportions as hereinafter defined, the load life characteristics of our novel resistor, a first embodiment of which we shall refer to as the APS resistor, easily exceeds the requirements of MIL R–11D. A second embodiment, identified as the APSS resistor exhibits characteristics which exceed those of the APS resistor.

The formulation of the composition resistors of this invention broadly consist of a resin binder, a conductant, and a filler. For purposes of converting the formulation into a resistance ink suitable for printing, spraying, etc., on a substrate, sufficient solvent for dissolving the binder and wetting the filler and conducting material must be used. A small amount of a catalyst may also be necessary. However, both the solvent and the catalyst are volatiles and for all practical purposes are completely evaporated during the curing of the resistors. Suitable ranges of the ingredients of our cured APS composition resistor are as follows:

| | Percent |
|---|---|
| Resin binder | 60–75 |
| Conductant | 3–15 |
| Filler | 20–30 |

The novelty of this resistor resides in the use of a resin binder which comprises both phenolic and silicone resins in such proportions that the requirements of MIL R–11D are met and at the same time the binder is not adversely affected by the above-mentioned degreasing and other processing steps.

We have made satisfactory resistors wherein the range by weight of phenolic resin to silicone resin in the binder is between 8:2 and 1:1, but a 7:3 ratio has provided superior results and the preferred range is between 8:2 and 7:3, i.e. 20% to 30% of silicone by weight and the balance of the resin being phenolic resin.

The phenolic resins employed in carrying out this invention may be any of those resins defined in United States Patent No. 3,056,750, including a liquid, one-step thermosetting phenol formaldehyde resin having 90% of solids at 135° C. and a viscosity of 1,000 to 3,000 centipoises at 25° C., available commercially as Durez 7522. In addition, a phenolic resin which has been found to be particularly useful as the binder is an aniline modified phenol formaldehyde having an average molecular weight of 400 to 600 and available commercially from Union Carbide Corporation under the name of BRK–4070.

The silicone resin of this invention is preferably of the class alkyl-aryl polysiloxane. A suitable silicone resin of this class is available commercially as SR–98 from General Electric Company and is a methyl phenyl polysiloxane with a methyl to phenyl ratio of 1.2:1.

The filler of this invention is preferably beta eucryptite, a hexagonal form of lithium aluminum silicate ($LiAlSiO_4$), and is obtainable from Carborundum Company under the name Lithofrax 2121. Other well known inert filler materials, such as for example silica flour, may obviously be used in our resistor composition.

The conductant for the APS resistor mentioned above normally consists of carbon, such as Excelsior carbon, coated with a small amount of phenolic resin in accordance with the teaching of Patent No. 3,056,750. However, for low resistance values, it has been found necessary to use carbon alone as the conductant.

The silicone resin is a methyl-phenyl polysiloxane of the class alkyl-aryl having a methyl to phenyl ratio of 1.2:1. The resin with 50% solids and 50% solvent is available commercially from General Electric Company as SR–98.

The conductant is Excelsior carbon, the filter is lithium aluminum silicate, the catalyst is hexamethylenetetramine $(CH_2)_6N_4$, the phenolic solvent is diethylene glycol monobutyl ether, and the silicone solvent is xylene.

In preparing an ink from the above materials, 3 to 5 drops of anti-foaming material are added to the mix to prevent foaming during mixing. The mixing is preferably done in a 3-roll paint mill. Additional diethylene glycol monobutyl ether may be added to adjust the viscosity if necessary for proper application to the insulated substrate.

After adjusting the inks to a viscosity suitable for screen printing with diethylene glycol monobutyl ether, resistor stripes were applied by printing on substrates consisting of ceramic plates and having suitable conductive terminations. These plates were placed in an oven at 425° F. The solvents and vehicles referred to are volatile and are driven off during this curing.

Wire leads were then attached by both dip soldering and hand soldering techniques, degreased in trichloroethylene vapors and/or liquids, and then a protective coating of Durez 16382 was applied and baked to set the coating. The test pieces were then impregnated with Araclor resin #5460.

Durez 16382 is a filled, phenolic, thermosetting resin. It is readily applied as a dip coating, for instance, when mixed with a suitable solvent, e.g. acetone, denatured ethyl alcohol such as commercially available "Solox," or isopropyl alcohol.

The mixture can be proportioned to make the total change in resistance after processing ±1%. The effects of relative humidity (RH) were then checked by the following tests:

| | | Percent change |
|---|---|---|
| (1) 96 hr. @ 40° C.—90–95% RH | | ±1 |
| (2) 72 hr. @ 65° C.—90–95% RH | max. | −3 |

In the broader aspects of the intervention, the Durez 16382 is merely representative of a protective coating of electrically nonconductive material for the ink; also, the Araclor is a thermoplastic resin merely representative as an impregnant to provide an effective moisture barrier.

The printing may be done on a "screw" printer using a 165 mesh stainless steel screen with a sqeegee pressure of from 3–4 lb./sq. in. and approximately 0.015 in. clearance between the screen and the ceramic substrate or other area to be coated with the resistance material.

Immediately after printing, the samples are preferably placed on edge in a coil spring type rack for baking.

This rack with the freshly printed samples can be placed in an air circulating oven preheated to 425° F., and the solvents and vehicles volatilize. A baking schedule of 5 min. at 425° F., followed by a final bake of approximately 2 hr. at 400° F., gives good results. The resistance value is set by the initial 425° F. cure; the value remains essentially constant during and after the 2-hr. cure at 400° F., and subsequent processing does not change the stability, such as the subsequent attachment of leads by soldering. This example is merely by way of illustration. The samples may be dip soldered, vapor degreased, cover coated, and impregnated in accordance with conventional procedure.

EXAMPLE 2

An ink identified as P–463 for depositing on an insulated substrate was prepared from the following formulation:

| | G. |
|---|---|
| Phenolic resin | 70.0 |
| Silicone resin | 30.0 |
| Conductant | 20.0 |
| Lithium aluminum silicate | 35.0 |
| Diethylene glycol monobutyl ether | 35.0 |
| Xylene | 30.0 |
| Hexamethylenetetramine | 3.5 |

The above formula was prepared and applied to a ceramic substrate by the same procedure as described with relation to formula P–462 above. The ingredients of P–463 are the same as P–462 except that the conductant in P–463 is formed of discrete units of Excelsior carbon coated with a phenolic resin in accordance with the teachings of United States Patent No. 3,056,750. The discrete units were formed of approximately 93% by weight carbon and 7% phenolic resin.

Several additional resistors were prepared from inks identified as P–464 through P–469 in the same manner as resistors were prepared from inks P–462 and P–463. The P–464 through P–469 inks were made from the same ingredients as P–463, but the proportions of ingredients were varied to alter the resistance value. The conductant in each case was formed of discrete units of Excelsior carbon coated with a phenolic resin, the discrete units containing 90% to 93% carbon and 10% to 7% phenolic resin.

APS resistors made from the above formulations obtained the following electrical properties:

TABLE I

| Mix No. | Resist. Value | Voltage Coeff. | Resist. Temp. Characteristics | |
|---|---|---|---|---|
| | | | At −55° C. | At +105° C. |
| P-462 | 6K | 0.0013 | +1.10 | +1.66 |
| P-463 | 47K | 0.0071 | +0.23 | +3.61 |
| P-464 | 90K | 0.0012 | −0.55 | +5.21 |
| P-465 | 35M | 0.0154 | −8.00 | +5.00 |
| P-466 | 250K | 0.0007 | −2.15 | +7.87 |
| P-467 | 650K | 0.0014 | −3.23 | +7.34 |
| P-468 | 1.0M | 0.0038 | −4.51 | +8.15 |
| P-469 | 1.6M | 0.0044 | −5.00 | +7.78 |

FIGURE 1 compares the load life of a typical prior art AP resistor with the load life of several APS resistors which contain approximately 30% silicone resin and 70% phenolic resin as the binder. Each of the APS resistors has a specific resistance value as specified. FIGURE 1 also shows the load life requirements of MIL R–11D. It will be noted from FIGURE 1 that the load life of an APS resistor is easily within the 6% maximum allowable change at the end of a 1,000 hr. test.

We have found, however, that the load life of film composition resistors can be greatly extended beyond the load life of the novel APS resistors of this invention by using as the conductant carbon particles coated with silicone to form discrete units in accordance with the process of United States Patent No. 3,056,750.

I refer to resistors which utilize a conductant comprising carbon particles coated with silicone resin as APSS resistors. The following formulations, identified as P-470 through P-484, are given as examples of inks which may be formed into an APSS film resistor which exhibits improved electrical properties:

EXAMPLE 3

P–470:

| | G. |
|---|---|
| Phenolic resin | 70.0 |
| Silicone resin | 30.0 |
| Conductant | 20.0 |
| Lithofrax | 35.0 |
| Hexamethylene tetramine | 3.5 |
| Diethylene glycol monobutyl ether | 35.0 |

EXAMPLE 4

P–474:

| | G. |
|---|---|
| Phenolic resin | 70.0 |
| Silicone resin | 30.0 |
| Conductant | 5.0 |
| Lithium aluminum silicate | 35.0 |
| Hexamethylene tetramine | 3.5 |
| Diethylene glycol monobutyl ether | 35.0 |

Additional inks, identified as P–471, P–472, and P–473, were prepared with the same ingredients as P–470 and P–474, but with different proportions to obtain intermediate resistance values.

Each of the inks P–470 through P–474 was prepared and processed with the materials and in the manner above described for inks P–462 through P–469 except as previously pointed out, the conductant consisted of silicone coated carbon. Tests on resistors made from these inks show the characteristics set forth below:

TABLE II

| Mix No. | Resist. Value (Kilohms(K)) | Voltage Coeff. | Resist. Temp. Characteristics | |
|---|---|---|---|---|
| | | | At −55° C. | At +105° C. |
| P–470 | 9.0 | 0.0008 | +0.88 | +1.70 |
| P–471 | 23.0 | 0.0008 | +1.16 | +2.27 |
| P–472 | 42.0 | 0.0008 | +1.54 | +2.09 |
| P–473 | 135.0 | 0.0014 | +1.31 | +2.55 |
| P–474 | 215.0 | 0.0017 | +1.27 | +2.03 |

FIGURE 2 compares the load life of a typical prior art AP resistor with the load life of APSS resistors made from formulations P–470 through P–474. The graph of FIGURE 2 also shows the load life requirements of MIL R–11D. The graph shows that there is less than a 6% resistance change of the APSS resistor after loading for 10,000 hr. and more which far exceeds the 1000 hr. requirement of MIL R–11D and the results of the prior art resistor.

It should be noted that in all of the formulas P–463 through P–474 the amount of resin used to coat the carbon of the conductant is part of the resin binder but is practically negligible when compared to the overall quantity of ingredients in the resistor. For example, in formula P–463 the amount of phenolic resin present in the finished resistor manufactured from this formulation and which results from the coating on the carbon particles is less than 1% by weight of the resistor composition. In all cases the resin used to coat the carbon particles will vary from approximately 1% or less of the total weight of the resistor composition.

It is to be understood that the present invention is not to be considered limited to any of the specific embodiments herein illustrated and described, but may be used in other ways without departure from its spirit as defined in the forthcoming claims.

We claim:

1. An electrical resistor composition consisting essentially or from 3% to 15% by weight of conductant particles selected from the group consisting of carbon particles and particles of an aggregate of carbon and resin, from 20% to 30% inert non-conductive filler and from 60% to 75% resin binder, said binder consisting essentially of a mixture of phenol formaldehyde resin and an alkyl-aryl polysiloxane in the proportion of from one to four parts by weight of phenol formaldehyde resin to each part of said polysiloxane.

2. An article of manufacture comprising an electrically non-conductive substrate of temperature resistant material, electrically conductive terminations spaced apart in an area on said substrate and an electrically resistive coating over said area electrically connecting said terminations, said resistive coating consisting essentially of from 3% to 15% by weight of conductant particles selected from the group comprising carbon particles and particles of an aggregate of carbon and resin, from 20% to 30% inert non-conductive filler and from 60% to 75% resin binder, said binder consisting essentially of a mixture of phenol formaldehyde resin and an alkyl-aryl polysiloxane in the proportion of from one to four parts by weight of phenol formaldehyde resin to each part of said polysiloxane.

References Cited

UNITED STATES PATENTS

| | | | |
|---|---|---|---|
| 2,526,059 | 10/1950 | Zabel et al. | 252—511 |
| 2,633,457 | 3/1953 | Hardwick | 260—826 |
| 3,030,237 | 3/1962 | Price | 252—511 X |
| 3,056,750 | 10/1962 | Pass | 252—511 |

OTHER REFERENCES

Lee-Neville, Epoxy Resins, McGraw-Hill (1957) page 151.

LEON D. ROSDOL, *Primary Examiner.*

J. D. WELSH, *Assistant Examiner.*